(No Model.)
W. STRAIT.
HARROW.
No. 579,191.　　　　　　　　　　Patented Mar. 23, 1897.
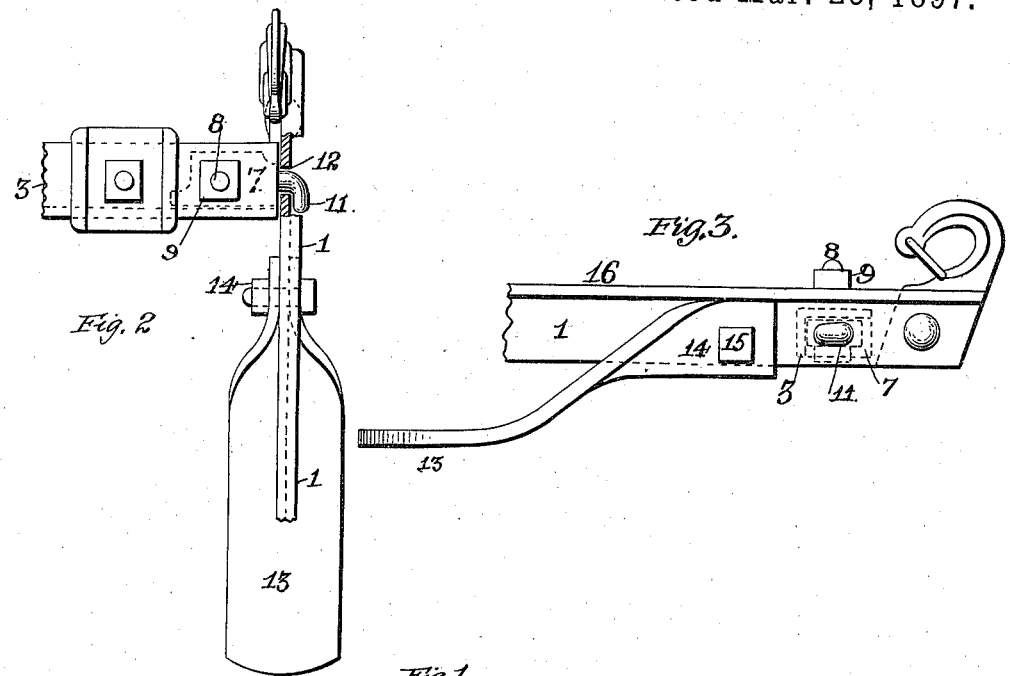
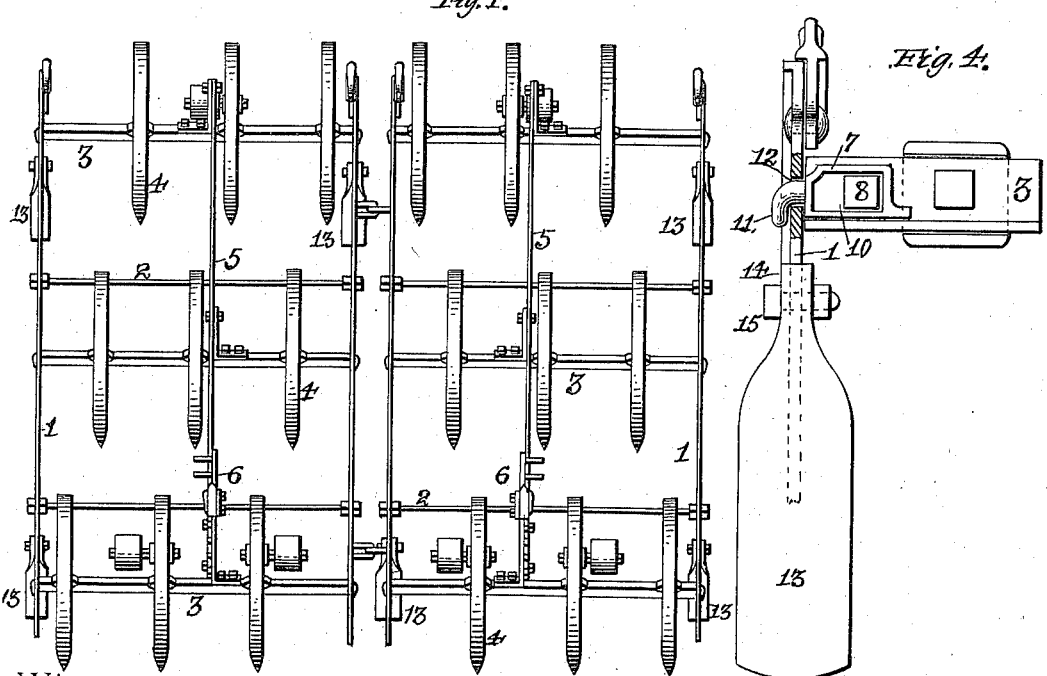
Witnesses:
　Fred E. Tasker
　William H. Reid
Inventor.
　William Strait
　by Fenelon B. Brock
　　Attorney.

UNITED STATES PATENT OFFICE.

WILLIAM STRAIT, OF ELMIRA, NEW YORK.

HARROW.

SPECIFICATION forming part of Letters Patent No. 579,191, dated March 23, 1897.

Application filed May 10, 1895. Serial No. 548,844. (No model.)

*To all whom it may concern:*

Be it known that I, WILLIAM STRAIT, a citizen of the United States, residing at Elmira, in the county of Chemung and State of New York, have invented certain new and useful Improvements in Harrows; and I do declare the following to be a full, clear, and exact description of the invention, such as will enable others skilled in the art to which it appertains to make and use the same, reference being had to the figures of reference marked on the accompanying drawings, which form a part of this specification.

My invention relates specifically to a means of pivotally securing the tooth-supporting bars or rods to the side bars of the framework of an adjustable tooth-harrow; also, to a novel construction and mode of attachment of the shoe or runner by which the implement is supported when being carried to and from the field.

In the accompanying drawings, Figure 1 shows a typical form of spring-tooth harrow in the construction of which my said improvements have been used. Fig. 2 represents a plan view of the pivotal attachment of the tooth-bar to the side bar with the shoe attached to the side bar. Fig. 3 is a bottom view of the parts shown in Fig. 2. Fig. 4 is a side view of the parts shown in Fig. 2.

In the several figures in my accompanying drawings, 1 represents the side bars of the harrow, rigidly connected by the bars 2. Pivoted between the bars 1 are the bars 3, preferably of angle-iron, to which are secured harrow-teeth of any desired form. I have shown a well-known form of spring-tooth 4, rigidly secured to the angle-bar 3. Any desired kind of device for rocking the bars 3 for the purpose of adjusting the angle of the tooth 4 can be applied. I have indicated a connecting-rod 5, with cranks 6 pivoted thereto and secured to the angle-bars 3.

7 is an iron block bolted to the end of the angle-bar 3 by a bolt 8, passing through the said block and bar and secured by a nut 9. The block has a slight depression corresponding in shape to the head of the bolt to prevent the latter from turning when the nut is tightened. The block preferably lies in the angle of the angle-bar so that one bolt will secure it rigidly in place.

The block is secured to the angle-bar with one end preferably flush therewith. From this end of the block and preferably integral therewith projects a short hook 11. The side bar has a hole 12, into which this hook is to be inserted. The hook is preferably tapered and contains a sharp bend $12^a$ in it. When the block 7 is detached from the angle-bar, the hook can be readily inserted in the hole 12; but on securing the block to the angle-bar after the hook has been inserted in the said hole the hook cannot be withdrawn therefrom, but will rotate only in the side bar, thus giving the desired pivotal connection.

13 represents my improved shoe. At the end by which it is to be secured to the side bar I bend the two edges up toward each other till they form an elongate U, the distance between the parallel sides being about the thickness of the side bar. Into this channel the side bar is inserted until its edge bears on the channel of the U, when a bolt 15 is passed through the U-shaped part and the side bar securing them rigidly together.

To afford additional security, the edges of the U-shaped part may bear against a projecting ledge 16 of the side bar, as shown in Fig. 3, but this is not essential, as the edge of the bar being forced home in the bottom of the channel a rigid fastening is insured.

Without limiting myself to the precise construction and arrangement of parts shown and described, what I claim is—

1. A detachable coupling for harrows or the like consisting of a flat body part or block provided with a bolt-hole and means to engage the bolt-head to prevent turning and a pintle projecting from the body part in line therewith and at right angles to the plane of the end of the body part and having its end bent substantially parallel to the plane of said end.

2. A detachable coupling for harrows consisting of a flat body part provided with a bolt-aperture, a depression in its face, and a pintle projecting from the end of the body part and having its extremity bent parallel to the plane of the end of the body part.

3. In a harrow, the combination with a side bar disposed upon its edge, of an angle-iron tooth-bar likewise disposed, and having its extremity adjacent to the side bar, a detachable coupling-block provided with a bolt-hole, and a pintle projecting from the body part through a transverse aperture in the side bar in line with the tooth-bar and bent at right angles, a bolt securing said block against the face of the angle-iron tooth-bar, and means to prevent the turning of the bolt, substantially as described.

4. As an article of manufacture, a shoe for harrows and the like, having a bolt-hole, an elongated horizontal U-shaped front portion with parallel sides, an intermediate downwardly-inclined part having outwardly-curved edges, and a rear horizontal portion; the upper edges of the front portion merging into the curved sides of the intermediate portion and into the parallel edges of the rear horizontal portion, and the bottom wall of the front portion merging into the face of the inclined part.

In testimony whereof I affix my signature in the presence of two witnesses.

WM. STRAIT.

Witnesses:
FENELON B. BROCK,
J. FRED. KELLEY.